United States Patent [19]
DeCrouppe et al.

[11] Patent Number: 5,417,126
[45] Date of Patent: May 23, 1995

[54] SELECTOR LEVER ARRANGEMENT FOR AN AUTOMATIC TRANSMISSION OF A MOTOR VEHICLE

[75] Inventors: Guido DeCrouppe, Kerpen/Horrem; Graeme Turner, Much, both of Germany

[73] Assignee: Ford Motor Company, Dearborn, Mich.

[21] Appl. No.: 197,045

[22] Filed: Feb. 16, 1994

[51] Int. Cl.⁶ .................. F16H 59/04; F16H 63/38
[52] U.S. Cl. ............................... 74/475; 74/98; 74/538
[58] Field of Search ........... 74/98, 335, 473 R, 475, 74/527, 538

[56] References Cited
FOREIGN PATENT DOCUMENTS

| | | | |
|---|---|---|---|
| 481915 | 3/1952 | Canada ................ | 74/475 |
| 0279087 | 3/1991 | European Pat. Off. . | |
| 1963545 | 7/1979 | Germany . | |

*Primary Examiner*—Charles A. Marmor
*Assistant Examiner*—Chong H. Kim
*Attorney, Agent, or Firm*—Frank G. McKenzie; Roger L. May

[57] ABSTRACT

A selector lever arrangement for an automatic transmission, comprising a lever (10) in a housing (2) pivotable about a horizontal transverse axle (9), wherein the housing (2) is dome-shaped with side walls (4 to 6) and is covered by a member (14) and a cover (20) with a gate, and wherein lever (10) has a hand grip (11) with a control knob (12), a catch device (19) operated by the control knob (12) by which the lever (10) is pivotably mounted on axle (9), the mounting member (13) being connected to a Bowden cable linkage (27) which transmits movements to the shift input element of the automatic gearbox.

7 Claims, 2 Drawing Sheets

SELECTOR LEVER ARRANGEMENT FOR AN AUTOMATIC TRANSMISSION OF A MOTOR VEHICLE

BACKGROUND OF THE INVENTION

1. Field of the Invention

The invention relates to a selector lever arrangement for an automatic transmission of a motor vehicle, comprising a selector lever mounted in a housing on the vehicle floor to be pivotable about a horizontal transverse axle and means connecting the lever to a linkage leading to the automatic gearbox.

2. Description of the Prior Art

A selector lever arrangement for an automatic transmission of a motor vehicle of this kind is known from German Patent 19 63 545.

In such a selector lever arrangement for a motor vehicle with a standard power train, i.e., with an internal combustion engine mounted lengthways in front, followed by an automatic gearbox acting through a propeller shaft on a differential from which the rear wheels of the motor vehicle are driven via drive shafts, the connecting means comprises a lever arm extending downward from the horizontal transverse axle, from which a rod or Bowden cable linkage leads to the shift input element on the automatic gearbox.

In this known selector lever arrangement, a backward selection movement of the selector lever results in a forward selection movement in the connecting means, which is transmitted to the shift input element of the automatic gearbox situated in front of the selector lever arrangement. The rod or Bowden cable linkage is situated in the region of the transmission tunnel of the motor vehicle, beneath the vehicle floor.

From European Patent 0 279 087, a selector lever arrangement for a motor vehicle is known of the kind that is increasingly coming into use in recent times when a motor vehicle is equipped with front wheel drive, i.e., when a front transversely mounted internal combustion engine is followed by a transversely mounted automatic gear box. In this, the automatic gearbox is usually located beneath, or beneath and behind, the internal combustion engine, and the front wheels of the vehicle are driven through drive axles by way of a differential, which in most cases is integrated in the gearbox housing.

With such a front wheel drive arrangement, it has been found that the directions of movement occurring in a selector lever arrangement of the kind usually employed require complicated layouts for the Bowden cable linkage to the shift input element of the gearbox. The connecting means is therefore connected to or combined integrally with the lever mounting member so that the connection to the rod or Bowden cable linkage is made above the horizontal transverse axle of the selector lever, whereby the selection movements of the selector lever are transmitted without reversal of the direction of movement.

These known selector lever arrangements suffer from the disadvantage that the rod or Bowden cable linkage lies above the floor of the vehicle, so that a separate passage opening must be provided through the splashboard of the vehicle. As a result, the layout of this rod or Bowden cable linkage is made more expensive. Also, bringing the body and power train together vertically, as is usual in the final assembly, becomes more difficult.

It is therefore an object of the invention to provide an improved selector lever arrangement for an automatic transmission of a motor vehicle in which reversal of the direction of movement is avoided and consequently the necessary rod or Bowden cable linkage to the shift input element of the gearbox can be laid out beneath the floor of the vehicle.

SUMMARY OF THE INVENTION

This object is achieved, according to the invention, if the means for connecting the selector lever to the Bowden cable comprises a first toothed segment extending beneath the horizontal transverse axis and a second toothed segment in engagement with the first segment that is pivotable about a lower horizontal transverse axle and is connected nonrotatably to a lever arm that is connected at its free end to the Bowden cable.

According to the invention, therefore, a selector lever arrangement for an automatic transmission of a motor vehicle, comprises a selector lever mounted in a selector lever housing on the vehicle floor to be pivotable about a horizontal transverse axle, wherein the selector lever housing is dome-shaped with side walls serving inter alia to receive the horizontal transverse axle and is covered on top by a parallel-walled notched member and a cover with a gate, and wherein the selector lever has at its top a hand-grip with a control knob, in the region of the catch member a catch device operable by means of the control knob, and at the bottom a mounting member by means of which the selector lever is pivotably mounted on the horizontal transverse axle, the mounting member comprising or being connected to connecting means to which is connected a Bowden cable linkage which transmits the selection movement to the shift input element of the automatic gearbox.

The connecting means comprises a first toothed segment extending beneath the horizontal transverse axle and in engagement with a second toothed segment that is pivotable about a lower horizontal transverse axle, and a lever arm is connected nonrotatably to the lower transverse axle and is linked at its free end to the Bowden cable linkage.

Further objects and advantages of the invention will appear from the following description and claims.

BRIEF DESCRIPTION OF THE DRAWINGS

The invention will now be explained more fully with reference to an exemplary example illustrated in the drawings, in which.

DESCRIPTION OF PREFERRED EMBODIMENTS

Figure 1:
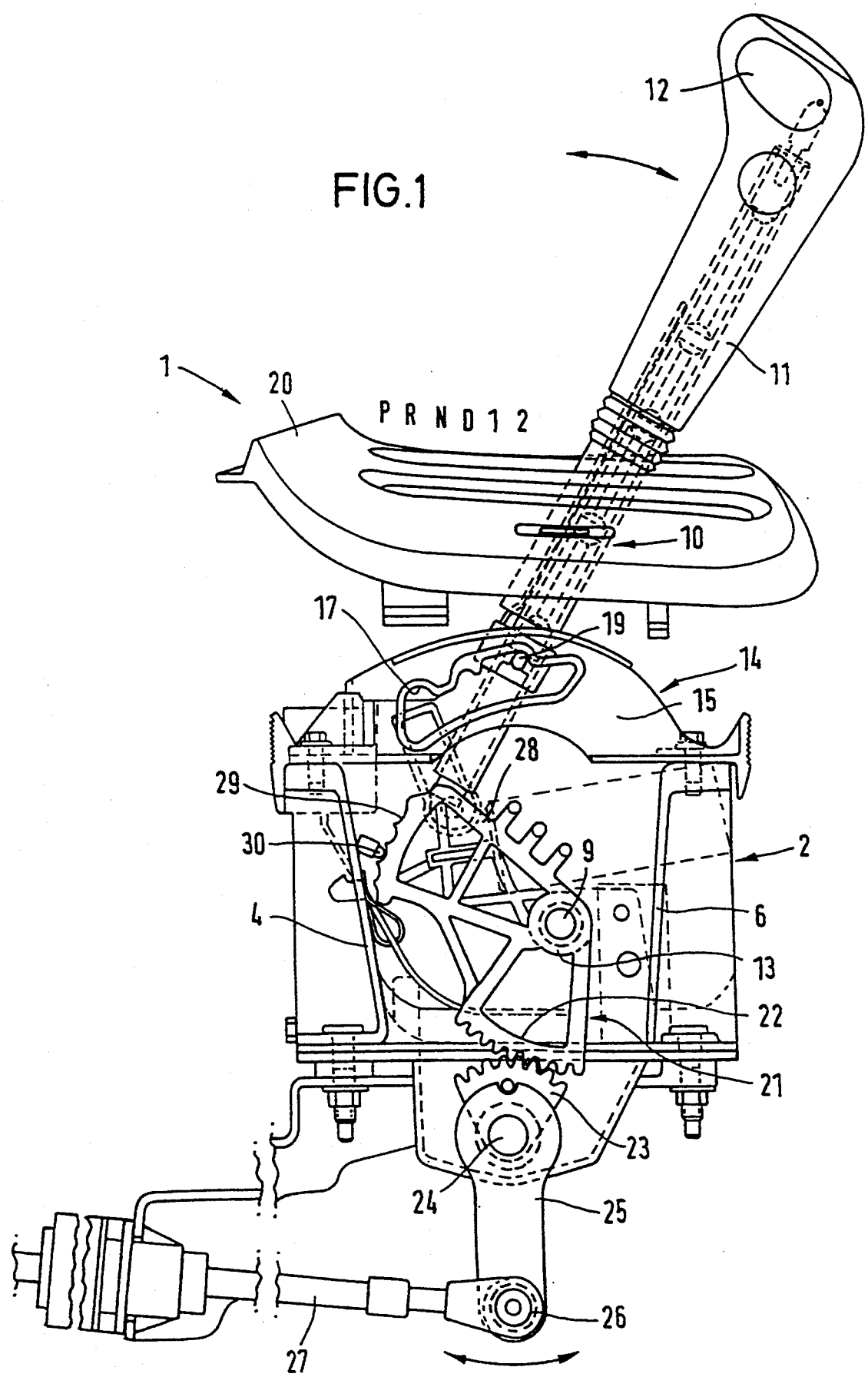
FIG. 1 shows a vertical side view of a selector lever arrangement according to the invention, in which the components important for the invention are emphasized by omitting parts of the side wall 3.
Figure 2:
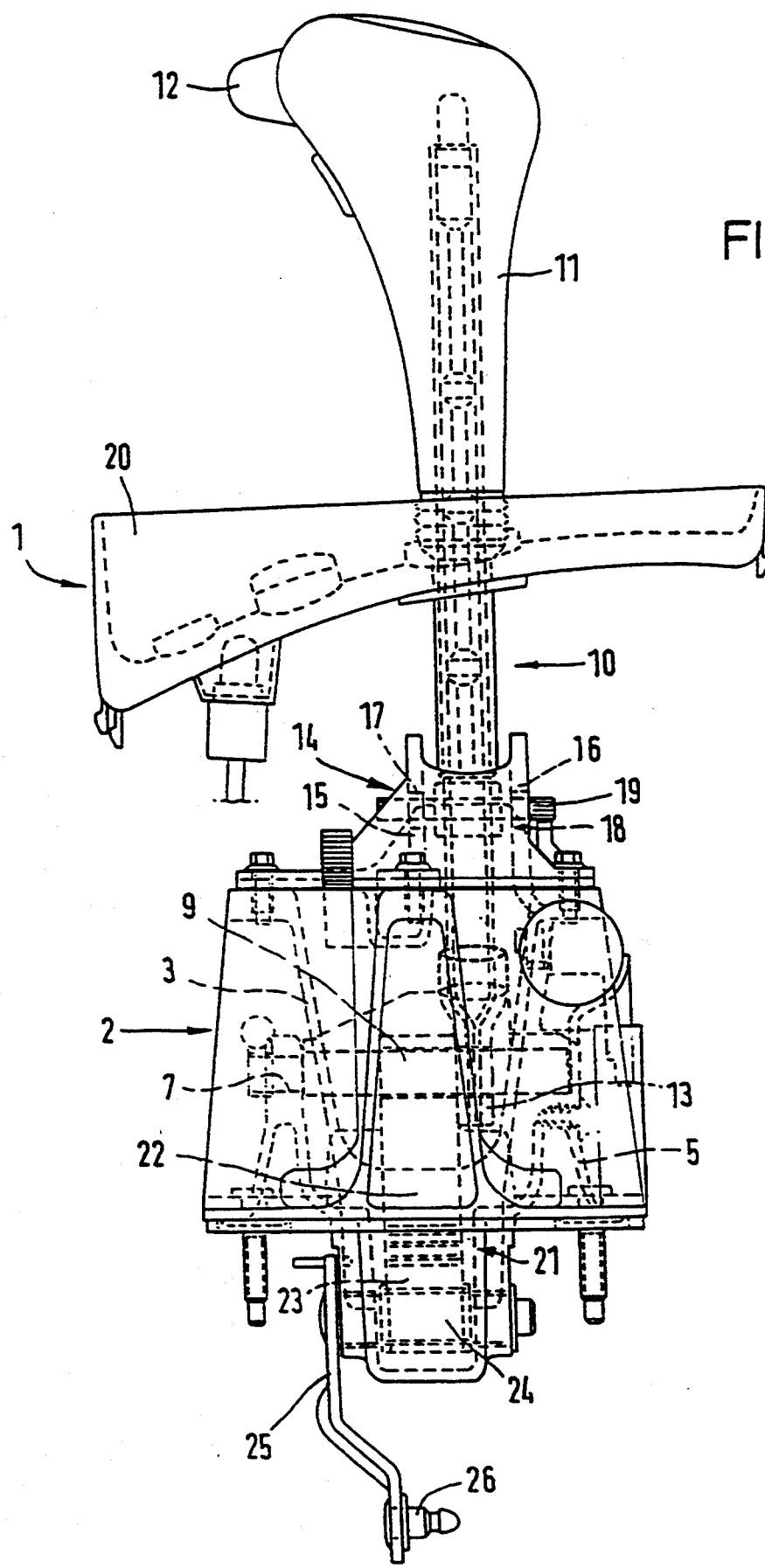
FIG. 2 shows a vertical rear view of the selector lever arrangement of FIG. 1 with the components important for the invention.

A selector lever arrangement 1 for an automatic transmission of a motor vehicle consists essentially of a selector lever housing 2 for attachment to the floor of the vehicle (not shown). Formerly this housing consisted of sheet or die-cast metal, but today it is in most cases made by injection moulding from a suitable high grade plastic material. The dome-shaped selector lever housing 2 has substantially vertical side walls 3, 4, 5 and 6, of which the two lateral side walls 3 and 5 have bearing openings 7 for a horizontal transverse axle 9.

A selector lever 10 has a hand grip 11 at the top with a control knob 12, and is connected at the bottom to a mounting member 13, by means of which it is pivotably mounted on the horizontal transverse axle 9.

The dome-shaped selector lever housing 2 is covered on top by a parallel-walled notched member 14. In the side walls 15 and 16 of this are gate notches 17 and 18, which cooperate with a catch device in the form of a horizontal catch bolt 19, which can be operated by the control knob 12 by way of a suitable connection (indicated only in broken lines).

The selector lever arrangement is covered on the side facing the vehicle interior by a cover plate 20 with a suitably styled gate guide.

Up to this point, the selector lever arrangement corresponds essentially to a conventional design in which the mounting member 13 may have arms extending above or below the horizontal transverse axle 9, which can be used as the connection with the Bowden cable. Depending on whether the Bowden cable arrangement is above or below the horizontal transverse axle 9, there is either one reversal of the direction of the selection movement or none.

Such a direct linkage of the Bowden cable arrangement to the mounting member 13 still has the disadvantage that, depending on the pivot point, there is no clear linearity between the selection movement of the selector lever and the movement of the corresponding mounting member.

According to the invention, therefore, the mounting member 13 is connected to a special connecting means 21.

The connecting means 21 comprises a first toothed segment 22 extending beneath the horizontal transverse axle 9, which engages with a second toothed segment 23, mounted on a lower horizontal transverse axle 24, which is pivotably received in parts of the downwardly extending side walls 3 and 5 of the selector gear housing 2. On the lower horizontal transverse axle 24, is nonrotatably mounted a lever arm 25, at the lower end 26 of which is connected the Bowden cable linkage 27 to the automatic gearbox.

The mounting member 13, which receives the selector lever 10, may be an independent plastic material or die cast part pivotably mounted on the lower horizontal transverse axle 9 and is connected nonrotatably to an adjoining connecting member. Alternatively, the mounting member 13 and the connecting member can, as is shown here, be fabricated as an integral injection moulded plastic part.

In a similar manner, the lower toothed segment 23 can be connected nonrotatably to the lower transverse axle 24 and drive the lever arm 25, which is likewise connected non-rotatably to the transverse axle 24. However, another possibility is to combine the lower toothed segment 23 with the lever arm 25 as an integral plastics part.

Forming the connecting means as two toothed segments in mutual engagement enables the lever arm 25 to be arranged in an optimal vertical position irrespective of the inclination of the selector lever 10, so that the corresponding selection movements are transmitted substantially linearly to the shift input element of the automatic gearbox by way of the Bowden cable linkage.

On the connecting means, an upwardly extending cam segment 28 is preferably also provided, having a number of notches 29, which cooperate with a spring-and-ball catch 30 on the front side wall 4 of the selector lever housing 2 in order to locate the selector lever position more precisely.

What is claimed is:

1. An automatic transmission gear selector assembly for a motor vehicle, comprising:
    a first axle;
    a housing having side walls supporting said first axle;
    a selector lever extending within said housing;
    a mounting member connected to the selector lever, mounted on said first axle, pivotably supporting the selector lever on the first axle;
    connecting means including a first toothed segment extending radially from the first axle and driveably fixed to the mounting member, a second axle offset from the first axle and supported on the housing, a second toothed segment fixed to and extending radially from the second axle, the second segment engaged with the first segment for pivotal movement about the second axle as the selector lever pivots; and
    a lever arm fixed to the second axle for pivotal movement about said second axle in response to movement of the second toothed wheel.

2. The assembly of claim 1 further comprising a cable pinned to the lever arm.

3. The assembly of claim 1 wherein:
    the mounting member and first toothed segment of the connecting means are integral; and
    the second toothed segment and lever arm are integral.

4. The assembly of claim 1 wherein the mounting member and first toothed segment of the connecting means are integrally formed of moulded plastic; and
    the second toothed segment and lever arm are integrally formed of moulded plastic.

5. The assembly of claim 1 wherein the connecting means further comprises a cam segment extending radially from the first axle, having plural notches; and
    a detent including a catch held against displacement on the housing, biased into engagement with the notches.

6. The assembly of claim 3 wherein the connecting means further comprises a cam segment extending radially from the first axle, having plural notches; and
    a detent including a catch held against displacement on the housing, biased into engagement with the notches.

7. The assembly of claim 4 wherein the connecting means further comprises a cam segment extending radially from the first axle, having plural notches; and
    a detent including a catch held against displacement on the housing, biased into engagement with the notches.

* * * * *